Patented Sept. 19, 1922.

1,429,879

UNITED STATES PATENT OFFICE.

GEORGE B. HILL, OF INDIANAPOLIS, INDIANA, ASSIGNOR TO AMERICAN HOMINY COMPANY, OF INDIANAPOLIS, INDIANA, A CORPORATION OF NEW JERSEY.

CORE BINDER.

No Drawing.     Application filed September 15, 1919. Serial No. 324,013.

*To all whom it may concern:*

Be it known that I, GEORGE B. HILL, a citizen of the United States, residing at Indianapolis, in the county of Marion and State of Indiana, have invented certain new and useful Improvements in Core Binders, of which the following is a specification.

This invention relates to core binders, especially to a vegetable binder such as a flour used as a binder in making cores in foundry work. It is among the objects of this invention to produce a binder which burns out quickly in the hot casting, produces very little or no gas, and gives elasticity and hardness to the core.

In carrying the objects of my invention into effect I provide a flour, generally a corn flour, which preferably is produced by a special process. This flour, when used as a binder, permits the cores to contract upon contraction of the casting, thus avoiding any strain in the casting due to a rigid core, and it further allows the core to leave the casting very easily.

In producing this flour I take the degerminated portion of corn which is in the form of grits or meal flake, but usually I utilize the finer portions of the meal, since they are undesirable by-products in the production of edible corn products, such as hominy grits. The material is steamed and then rolled while still warm to the thinness of tissue paper to at least partially gelatinize the starch and destroy the cellular structure rendering proteid matter available to aqueous solvents by reason of the fine subdivision and relatively large surface area of the particles. The material is now partially soluble in water and is ground to the fineness desired.

The binder is mixed with water giving a smooth gelatinous mass having large bulk and great distributing properties. The material does not act as a flour but more like an oil leaving the crevices between the sand grains, with which it is mixed, free and open. The new binder may be used in combination with oil and when so used allows the amount of oil ordinarily used in a sand core to be reduced to a very small quantity. Such cores hold their shape without sagging or swelling regardless of the complicated outlines or large size of the same. By the use of this binder I am enabled in many cases to avoid the necessity of using loamy sand in connection with the ordinary sharp sand in order to make delicate cores stand up in the green.

I have found that this binder is three or four times as efficient as wheat flour and is ordinarily used in one-third or one-fourth the proportion. This binder differs widely from dextrin, partially dextrinized starch, and similar materials giving a much harder core with the use of a smaller quantity of binder. It appears that the protein which is contained in the gelatinized flour has the beneficial effects of allowing contraction of the core giving greater elasticity than other materials, and at the same time retaining the hardness of the core. It also allows the core to be easily broken into small pieces in order to remove the same from the casting. It has the further advantage over wheat flour and similar materials in that it requires no cooking or steaming of the core, and the mixture is self-drying and adhesive.

Having thus fully described my said invention, what I claim as new and desire to secure by Letters Patent, is:

1. A core binder comprising corn flour made from the degerminated portion of the kernel.

2. A core binder comprising dry gelatinized corn flour containing proteids.

3. A core binder comprising corn flour obtained by steaming and rolling the degerminated portion of corn and grinding the flakes so formed.

4. A core binder comprising dry partially gelatinized corn flour, the proteid matter in which is finely divided and has a relatively large surface area.

In witness whereof, I have hereunto set my hand and seal at Indianapolis, Indiana, this 11th day of September, A. D. nineteen hundred and nineteen.

GEORGE B. HILL. [L. S.]

Witnesses:
H. C. BIERMAN,
M. L. SHULER.